United States Patent
O'Gwynn et al.

(10) Patent No.: US 12,408,010 B2
(45) Date of Patent: Sep. 2, 2025

(54) SYSTEMS AND METHODS FOR USING ROLE-BASED VOICE COMMUNICATION CHANNELS

(71) Applicant: H.M. Electronics, Inc., Carlsbad, CA (US)

(72) Inventors: David O'Gwynn, Oceanside, CA (US); Rick Evan Schwartz, Carlsbad, CA (US)

(73) Assignee: H. M. Electronics, Inc., Carlsbad, CA (US)

( * ) Notice: Subject to any disclaimer, the term of this patent is extended or adjusted under 35 U.S.C. 154(b) by 141 days.

(21) Appl. No.: 18/452,369

(22) Filed: Aug. 18, 2023

(65) Prior Publication Data

US 2023/0396967 A1  Dec. 7, 2023

Related U.S. Application Data (63) Continuation of application No. 17/722,553, filed on Apr. 18, 2022, now Pat. No. 11,736,911, which is a continuation of application No. 17/188,717, filed on Mar. 1, 2021, now Pat. No. 11,310,634, which is a continuation of application No. 16/899,483, filed on Jun. 11, 2020, now Pat. No. 10,993,088.

(51) Int. Cl.
*H04W 4/10* (2009.01)
*H04W 4/08* (2009.01)

(52) U.S. Cl.
CPC ............... *H04W 4/10* (2013.01); *H04W 4/08* (2013.01)

(58) Field of Classification Search
CPC ................................. H04W 4/08; H04W 4/10
See application file for complete search history.

(56) References Cited

U.S. PATENT DOCUMENTS

| | | |
|---|---|---|
| 5,117,501 A | 5/1992 | Childress |
| 7,082,314 B2 | 7/2006 | Farmer |
| 7,920,539 B2 | 4/2011 | Stanford |
| 8,447,324 B2 | 5/2013 | Shuman |
| 8,553,865 B2 | 10/2013 | Menard |
| 8,983,383 B1 | 3/2015 | Haskin |

(Continued)

FOREIGN PATENT DOCUMENTS

| | | |
|---|---|---|
| CA | 3083577 | 6/2019 |
| EP | 1207452 | 5/2002 |

*Primary Examiner* — Raymond S Dean
(74) *Attorney, Agent, or Firm* — Esplin & Associates, PC (57) ABSTRACT

Systems and methods for managing voice communication channels used by a group of people are disclosed. Exemplary implementations may: electronically store information, wherein the information represents associations of individual voice communication channels with one or more communication groups, wherein individual ones of the one or more communication groups are specific to one or more roles of the people; receive device-specific packets from end-user communication devices associated with people, wherein the packets include packetized uplink information based on audio information captured by the communication devices, wherein individual packets are targeted to individual communication groups; generate and transmit downlink packets that include packetized downlink information that is organized in a set of broadcast channels for audio information that was targeted to specific communication groups.

20 Claims, 5 Drawing Sheets

(56) References Cited

U.S. PATENT DOCUMENTS

| | | | |
|---|---|---|---|
| 9,408,022 B1 | 8/2016 | O'Gwynn | |
| 9,641,926 B2 * | 5/2017 | Awiszus | H04R 25/00 |
| 9,641,933 B2 | 5/2017 | Appelbaum | |
| 10,869,179 B1 | 12/2020 | Ma | |
| 10,993,088 B1 | 4/2021 | O'Gwynn | |
| 11,310,634 B2 | 4/2022 | O'Gwynn | |
| 11,452,073 B2 | 9/2022 | O'Gwynn | |
| 11,665,713 B2 | 5/2023 | O'Gwynn | |
| 11,895,675 B2 | 2/2024 | O'Gwynn | |
| 2003/0100274 A1 | 5/2003 | Brown | |
| 2003/0134666 A1 * | 7/2003 | Fletcher | H04M 1/72513 |
| | | | 455/575.2 |
| 2003/0162504 A1 * | 8/2003 | Sabongi | H04W 24/00 |
| | | | 455/67.11 |
| 2004/0116071 A1 * | 6/2004 | Hall | H04M 1/6066 |
| | | | 455/3.06 |
| 2006/0045063 A1 | 3/2006 | Stanford | |
| 2006/0093117 A1 | 5/2006 | Agrawal | |
| 2007/0233905 A1 | 10/2007 | Hatano | |
| 2008/0160977 A1 | 7/2008 | Ahmaniemi | |
| 2008/0318592 A1 | 12/2008 | Mandalia | |
| 2009/0080396 A1 | 3/2009 | Song | |
| 2009/0291646 A1 | 11/2009 | Ong | |
| 2010/0094443 A1 | 4/2010 | Oh | |
| 2010/0190518 A1 | 7/2010 | Lindner | |
| 2010/0271983 A1 | 10/2010 | Bryant | |
| 2012/0140747 A1 | 6/2012 | Taniguchi | |
| 2014/0153485 A1 | 6/2014 | Tsuda | |
| 2016/0127264 A1 | 5/2016 | Williamson | |
| 2016/0189249 A1 * | 6/2016 | Meyer | H04L 67/53 |
| | | | 705/14.66 |
| 2016/0366528 A1 | 12/2016 | Landqvist | |
| 2017/0324807 A1 * | 11/2017 | Gu | H04L 67/561 |
| 2018/0317165 A1 | 11/2018 | Krishnamoorthy | |
| 2019/0104377 A1 | 4/2019 | Nilsson | |
| 2020/0106630 A1 | 4/2020 | Bourassa | |
| 2021/0243150 A1 | 8/2021 | Vasamsetti | |
| 2021/0392471 A1 | 12/2021 | O'Gwynn | |
| 2022/0053453 A1 | 2/2022 | O'Gwynn | |
| 2022/0094795 A1 | 3/2022 | O'Gwynn | |
| 2022/0240057 A1 | 7/2022 | O'Gwynn | |
| 2022/0272564 A1 | 8/2022 | Teyeb | |
| 2022/0279552 A1 | 9/2022 | Teyeb | |
| 2022/0303392 A1 | 9/2022 | O'Gwynn | |
| 2022/0361145 A1 | 11/2022 | O'Gwynn | |
| 2023/0209574 A1 | 6/2023 | O'Gwynn | |
| 2023/0325145 A1 | 10/2023 | Ni | |
| 2023/0362026 A1 | 11/2023 | Bajaj | |

* cited by examiner

SYSTEMS AND METHODS FOR USING ROLE-BASED VOICE COMMUNICATION CHANNELS

FIELD OF THE DISCLOSURE

The present disclosure relates to systems and methods for managing voice communication channels for groups of people interacting and/or otherwise working together, such as a crew of employees in a quick-service restaurant.

BACKGROUND

Communication systems using a central communication device and an end-user communication device are known. Intercom communication is known.

SUMMARY

One aspect of the present disclosure relates to a communication system configured for managing voice communication channels, e.g., as used by a crew of employees in a quick-service restaurant having a first drive-through lane and, in some cases, a second drive-through lane. The drive-throughs may include one or both of a menu board and a speaker post. The communication system may include electronic storage and one or more hardware processors. The electronic storage may electronically store information. The information represents associations of individual voice communication channels with one or more communication groups. Individual ones of the one or more communication groups may be specific to one or more (types of) roles performed by employees in the quick-service restaurant. The associations include a first, second, third, and so forth association. The first association is between a first voice communication channel and a first communication group. The first communication group may be specific to (a first type of) roles in the quick-service restaurant that are related to the first drive-through lane. The second association is between a second voice communication channel and a second communication group. The second communication group may be specific to (a second type of) roles in the quick-service restaurant, and in some cases may be related to the second drive-through lane. The third association is between a third voice communication channel and the first and second communication groups. The fourth association is between a fourth voice communication channel and the first communication group and a third communication group. The third communication group is specific to (a third type of) roles in the quick-service restaurant that may be related to food production. The fifth association is between a fifth voice communication channel and the second and third communication groups. The sixth association is between a sixth voice communication channel and the first, second, and third communication groups. The seventh association is between a seventh voice communication channel and the third communication group. The one or more hardware processors are configured by machine-readable instructions to receive a first device-specific packet from a first communication device associated with a first crew member. The first device-specific packet is received during a first uplink time period and includes packetized uplink information based on audio information captured by the first communication device. The first uplink time period occurs within a first time frame. The first device-specific packet may be targeted to the first communication group. The one or more hardware processors are configured by machine-readable instructions to receive a second device-specific packet from a second communication device associated with a second crew member. The second device-specific packet is received during a second uplink time period and includes packetized uplink information based on audio information captured by the second communication device. The second uplink time period occurs within a second time frame. The second device-specific packet may be targeted to the second communication group. The one or more hardware processors are configured by machine-readable instructions to receive a third device-specific packet from a third communication device associated with a third crew member. The third device-specific packet is received during a third uplink time period and includes packetized uplink information based on audio information captured by the third communication device. The third uplink time period occurs within a third time frame. The third device-specific packet may be targeted to the third communication group. The one or more hardware processors are configured by machine-readable instructions to generate a first downlink packet that includes packetized downlink information that is organized in a set of broadcast channels. The set of broadcast channels includes a first broadcast channel, a second broadcast channel, a third broadcast channel, a fourth broadcast channel, a fifth broadcast channel, a sixth broadcast channel, a seventh broadcast channel, and/or other broadcast channels. The first broadcast channel is used for audio information received in device-specific packets that were targeted to the first communication group. The second broadcast channel is used for audio information received in device-specific packets that were targeted to the second communication group. The third broadcast channel is used for audio information received in device-specific packets that were targeted to one of the first and second communication groups. The fourth broadcast channel is used for audio information received in device-specific packets that were targeted to one of the first and third communication groups. The fifth broadcast channel is used for audio information received in device-specific packets that were targeted to one of the second and third communication groups. The sixth broadcast channel is used for audio information received in device-specific packets that were targeted to one of the first, second, and third communication groups. The seventh broadcast channel is used for audio information received in device-specific packets that were targeted to the third communication group. The one or more hardware processors are configured by machine-readable instructions to transmit the first downlink packet to a set of end-user communication devices, including the first, second, and third communication devices.

Another aspect of the present disclosure relates to a communication system configured for managing voice communication channels, e.g., as used by a crew of employees in a quick-service restaurant having a first drive-through lane and, in some cases, a second drive-through lane. The communication system may include electronic storage and one or more hardware processors. The electronic storage may electronically store information. The information represents associations of individual voice communication channels with one or more communication groups selected from a set of communication groups. Individual ones of the one or more communication groups may be specific to one or more (types of) roles of people interacting within a group of people. Individual associations are between an individual voice communication channel and a given subset of the set of communication groups. The one or more hardware processors are configured by machine-readable instructions to receive device-specific packets from communication devices associated with people. The device-specific packets include packetized uplink information based on audio information captured by the communication devices. Individual device-specific packets are targeted to a given communication group. The one or more hardware processors are configured by machine-readable instructions to generate downlink packets that includes packetized downlink information organized in a set of broadcast channels. Individual broadcast channels are used for audio information received in device-specific packets that were targeted to particular voice communication channels, in accordance with a particular selection from the communication groups. The one or more hardware processors are configured by machine-readable instructions to transmit the downlink packets to a set of end-user communication devices.

Another aspect of the present disclosure relates to a method for managing voice communication channels used by a crew of employees in a quick-service restaurant having a first drive-through lane and, in some cases, a second drive-through lane. The method may include electronically storing information. The information represents associations of individual voice communication channels with one or more communication groups. Individual ones of the one or more communication groups may be specific to one or more (types of) roles of employees in the quick-service restaurant. The associations include a first association between a first voice communication channel and a first communication group. The first communication group may be specific to (a first type of) roles in the quick-service restaurant that are related to the first drive-through lane. The associations include a second association between a second voice communication channel and a second communication group. The second communication group may be specific to (a second type of) roles in the quick-service restaurant, and in some cases may be related to a second drive-through lane. The associations include a third association between a third voice communication channel and the first and second communication groups. The associations include a fourth association between a fourth voice communication channel and the first communication group and a third communication group. The third communication group may be specific to (a third type of) roles in the quick-service restaurant that may be related to food production. The associations include a fifth association between a fifth voice communication channel and the second and third communication groups. The associations include a sixth association between a sixth voice communication channel and the first, second, and third communication groups. The associations include a seventh association between a seventh voice communication channel and the third communication group. The method may include receiving a first device-specific packet from a first communication device associated with a first crew member. The first device-specific packet is received during a first uplink time period and includes packetized uplink information based on audio information captured by the first communication device. The first uplink time period occurs within a first time frame. The first device-specific packet may be targeted to the first communication group. The method may include receiving a second device-specific packet from a second communication device associated with a second crew member. The second device-specific packet is received during a second uplink time period and includes packetized uplink information based on audio information captured by the second communication device. The second uplink time period occurs within a second time frame. The second device-specific packet may be targeted to the second communication group. The method may include receiving a third device-specific packet from a third communication device associated with a third crew member. The third device-specific packet is received during a third uplink time period and includes packetized uplink information based on audio information captured by the third communication device. The third uplink time period occurs within a third time frame. The third device-specific packet may be targeted to the third communication group. The method may include generating a first downlink packet that includes packetized downlink information that is organized in a set of broadcast channels. The set of broadcast channels includes a first broadcast channel, a second broadcast channel, a third broadcast channel, a fourth broadcast channel, a fifth broadcast channel, a sixth broadcast channel, a seventh broadcast channel, and/or other broadcast channels. The first broadcast channel is used for audio information received in device-specific packets that were targeted to the first communication group. The second broadcast channel is used for audio information received in device-specific packets that were targeted to the second communication group. The third broadcast channel is used for audio information received in device-specific packets that were targeted to one of the first and second communication groups. The fourth broadcast channel is used for audio information received in device-specific packets that were targeted to one of the first and third communication groups. The fifth broadcast channel is used for audio information received in device-specific packets that were targeted to one of the second and third communication groups. The sixth broadcast channel is used for audio information received in device-specific packets that were targeted to one of the first, second, and third communication groups. The seventh broadcast channel is used for audio information received in device-specific packets that were targeted to the third communication group. The method may include transmitting the first downlink packet to a set of end-user communication devices, including the first, second, and third communication devices.

Another aspect of the present disclosure relates to a method for managing voice communication channels for a group of people. The method may include electronically storing information. The information represents associations of individual voice communication channels with one or more communication groups selected from a set of communication groups. Individual ones of the one or more communication groups may be specific to one or more (types of) roles of people interacting within the group of people. Individual associations are between an individual voice communication channel and a given subset of the set of communication groups. The method may include receiving device-specific packets from communication devices associated with people. The device-specific packets include packetized uplink information based on audio information captured by the communication devices. Individual device-specific packets are targeted to a given communication group. The method may include generating downlink packets that include packetized downlink information organized in a set of broadcast channels. Individual broadcast channels are used for audio information received in device-specific packets that were targeted to a particular communication group in accordance with a particular selection from the communication groups. The method may include transmitting the downlink packets to a set of end-user communication devices.

As used herein, any association (or relation, or reflection, or indication, or correspondency) involving communication systems, information processing units, processors, communication devices, communication devices, communication protocols, sub-systems, base stations, microphones, headsets, analog-to-digital converters, digital-to-analog converters, transceivers, encoders, decoders, channels, communication groups, time periods, time frames, packets, information signals, sounds, wires, formats, standards, connections, instructions, messages, user interfaces, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof. As used herein, the terms "connect" and "couple" (and derivatives thereof) may be used interchangeably to indicate a link between multiple components that may or may not include intermediary components.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
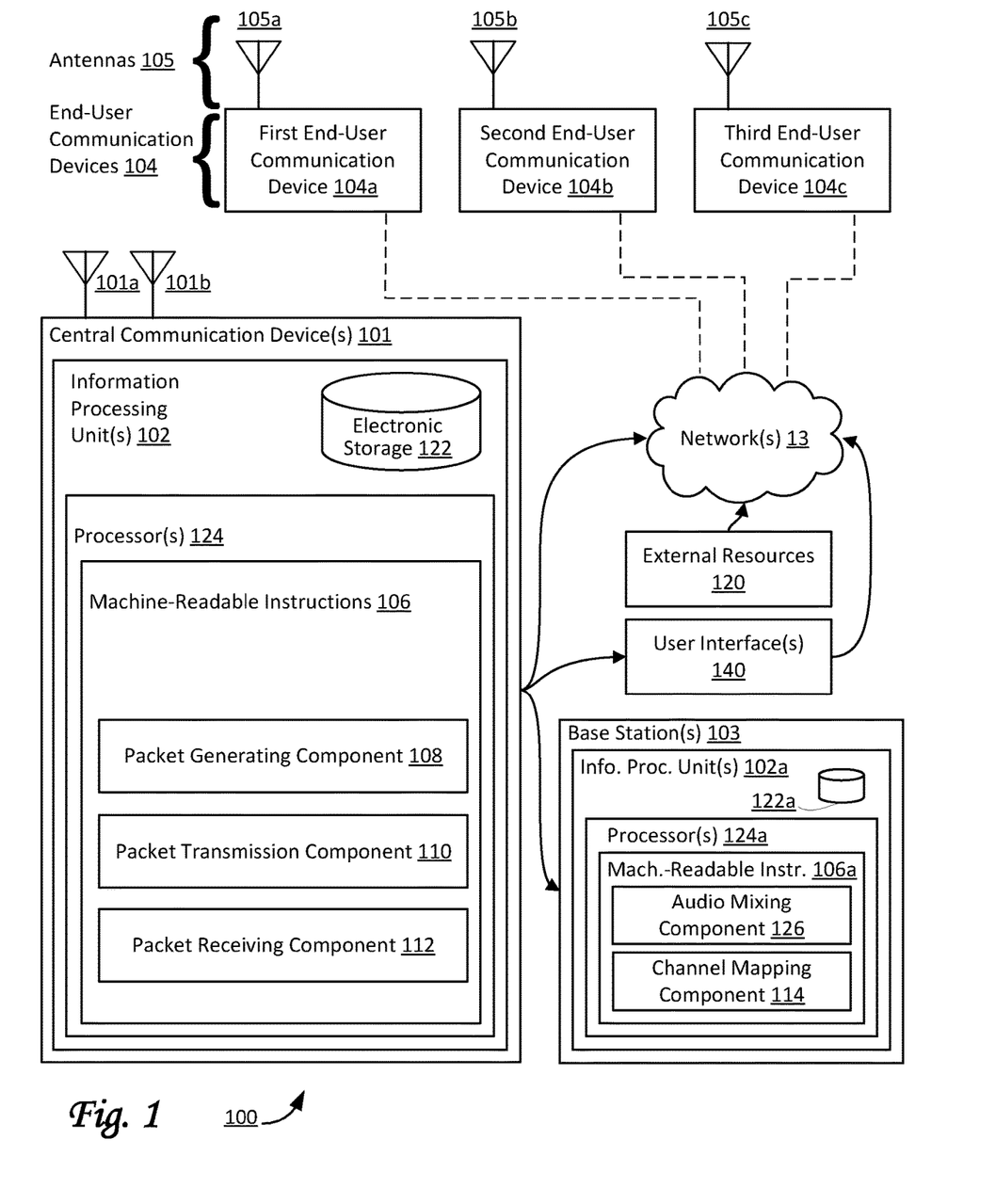
FIG. 1 illustrates a communication system configured for managing voice communication channels used by a crew of employees in a quick-service restaurant having one or more drive-through lanes, in accordance with one or more implementations.

FIG. 1 illustrates a system 100 configured for managing voice communication channels used, e.g., by a crew of employees in a quick-service restaurant having one or more drive-through lanes. System 100 may be referred to as an intercom communication system, or as a communication system. In some implementations, system 100 may include one or more central communication devices 101, one or more information processing units 102, one or more processors 124, electronic storage 122, one or more base stations 103, one or more external resources 120, one or more user interfaces 140, one or more end-user communication devices 104 and/or other components.

The users of system 100 may include employees, staff members or crew members, managers and/or other stakeholders, and/or other groups of people interacting and/or otherwise working together. The users of system 100 may be divided into a set of communication groups. In some implementations, individual communication groups may be specific to one or more (types of) roles of employees in a quick-service restaurant. For example, a given communication group may be specific to a given role or type of role of people interacting and/or otherwise working together. In some implementations, individual communication groups may be specific to one or more locations in a work area and/or other localized area. In some implementations, individual communication groups may be specific to one or more responsibilities in a work area and/or other localized area. For example, the communication groups for a quick-service restaurant may include four communication groups: a first communication group may be specific to roles in the quick-service restaurant that are related to a first drive-through lane, a second communication group may be specific to roles in the quick-service restaurant that are related to a second drive-through lane, a third communication group may be specific to roles in the quick-service restaurant that are related to food production, and a fourth communication group may be specific to roles in the quick-service restaurant that are related to the front counter. Variations may use only one drive-through lane, and/or may combine the groups for food production and front counter. For example, the communication groups for a theater production may include different communication groups for stage crew, audio-visual crew, lighting crew, front-of-house crew, director, etc. System 100 may be used in other contexts where people work together, including but not limited to theme park ride management, medical operating room communications, football coach communications, factory floor communications, and/or other contexts.

Figure 3A:
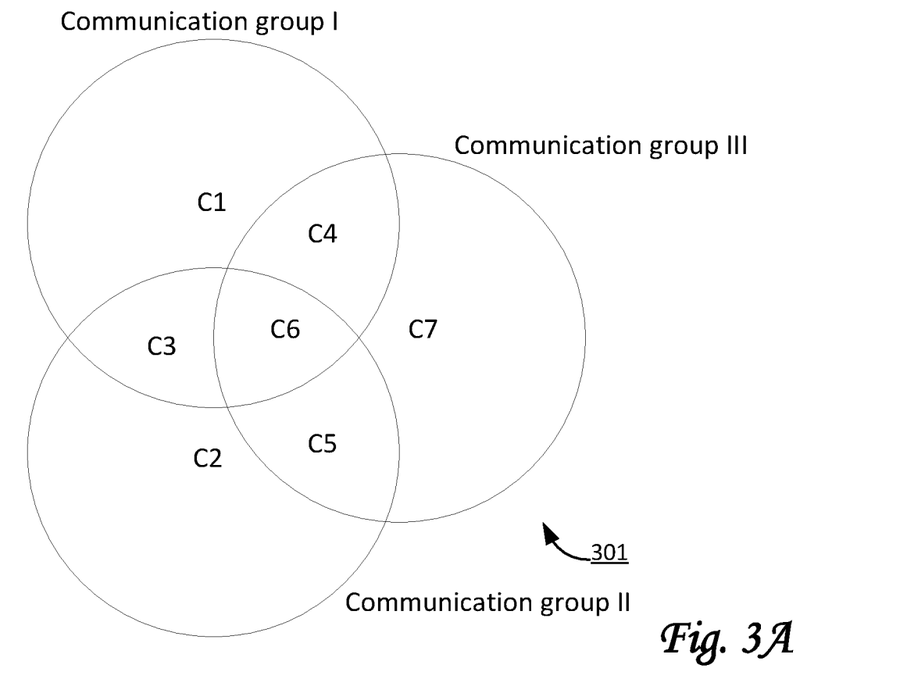
FIGS. 3A-3B-3C-3D illustrate exemplary sets of communication groups as may be used by a system configured for managing voice communication channels used by a group of people, in accordance with one or more implementations.

Voice communication channels managed by system 100 may facilitate communication among and/or between specific (sets of) communication groups. By way of non-limiting example, FIG. 3A illustrates an exemplary set 301 of three communication groups that are specific to different (types of) roles and/or locations in a work area, such as a quick-service restaurant. The first communication group is indicated by the label "Communication group I". The second communication group is indicated by the label "Communication group II". The third communication group is indicated by the label "Communication group III". Communication for different subsets of these three communication groups may use seven different voice communication channels as depicted. Communication to just the first communication group may use a first voice communication channel. Communication to just the second communication group may use a second voice communication channel.

Figure 3B:
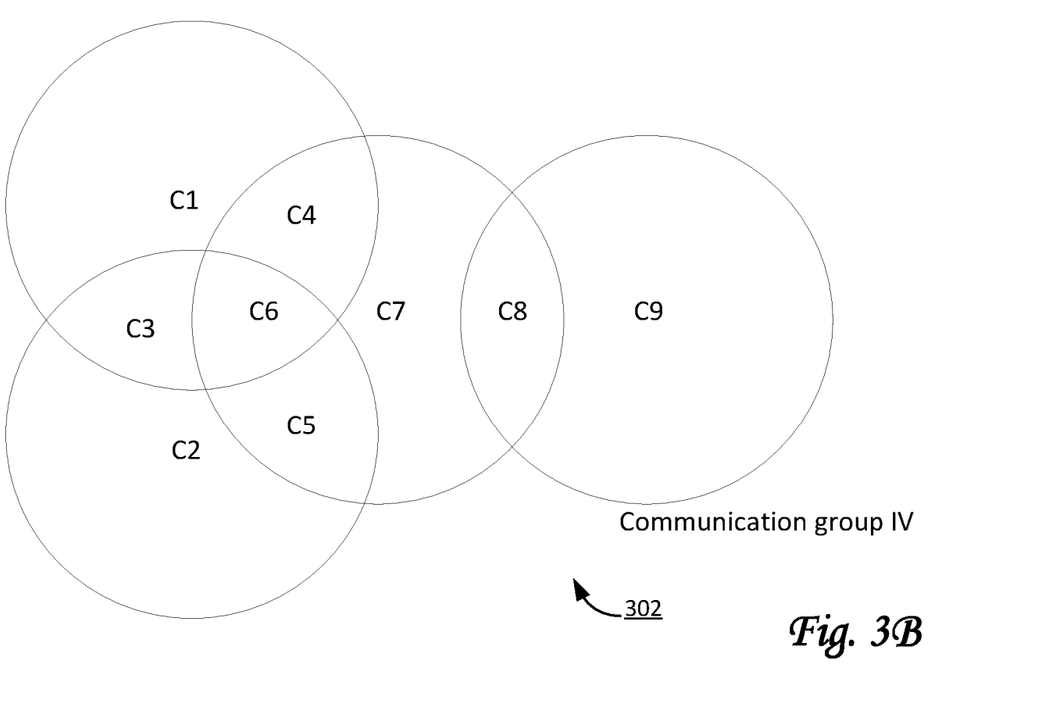

Communication to both the first and second communication groups may use a third voice communication channel "C3". Communication to just the third communication group may use a seventh voice communication channel. Communication to both the first and third communication groups may use a fourth voice communication channel "C4". Communication to both the second and third communication groups may use a fifth voice communication channel "C5". Communication to the first, second, and third communication groups may use a sixth voice communication channel "C6". In some implementations, a user in the first communication group could direct and/or transmit a voice message/communication to any of the communication groups, but would only receive voice messages/communication directed and/or transmitted to the first communication group (e.g., the user can select the first, third, fourth, or sixth broadcast channel, depending on which other communication groups are to be added/included). A user in the second communication group would only receive voice messages/communication directed to and/or transmitted to the second communication group (e.g., the user can select the second, third, fifth, or sixth broadcast channel, depending on which other communication groups are to be added/included). A user in the third communication group would only receive voice messages/communication directed to and/or transmitted to the third communication group (e.g., the user can select the fourth, fifth, sixth, or seventh broadcast channel, depending on which other communication groups are to be added/included). By way of non-limiting example, FIG. 3B illustrates an exemplary set 302 of four communication groups that are specific to different (types of) roles and/or locations in a work area, such as a quick-service restaurant. Exemplary set 302 is similar to set 301 of FIG. 3A, with an added fourth communication group, indicated by the label "Communication group IV". Communication to just the fourth communication group may use a ninth voice communication channel. Communication to both the third and fourth communication groups may use an eighth voice communication channel "C8". In some implementations, a user in the fourth communication group could direct and/or transmit a voice message/communication to any of the communication groups, but would only receive voice messages/communication directed and/or transmitted to the fourth communication group (e.g., the user can select the eighth or ninth broadcast channel, depending on which other communication groups are to be added/included). In this case, the user in the third communication group could additionally select the eighth voice communication channel.

Referring to FIG. 1, central communication device 101 (also referred to as central communication hub) and/or information processing unit(s) 102 may be configured to communicate with one or more end-user communication devices 104 according to a client/server architecture, a point-to-point architecture, and/or other architectures. End-user communication device(s) 104 (also simply referred to as communication devices) may be configured to communicate with other communication devices 104 via central communication device 101, information processing unit(s) 102, and/or other components of system 100. Users may access system 100 via communication devices 104. Communication devices 104 may include a first communication device 104a, a second communication device 104b, a third communication device 104c, and/or other communication devices. First communication device 104a may be associated with a first user, second communication device 104b may be associated with a second user, third communication device 104c may be associated with a third user, and so forth. Communication devices 104 may be portable communication devices. In some implementations, communication between communication devices 104 may be performed on a local communications network, such as, by way of non-limiting example, a local area network. Alternatively, and/or simultaneously, in some implementations, the local communications network may include a personal area network. For example, the local communications network may be used in a restaurant, a service location, a theater, an office, a building, a construction site, and/or in other localized areas.

Central communication device 101 may include one or more of information processing units 102, electronic storage 122, a first antenna 101a, a second antenna 101b, and/or other components. In some implementations, central communication device 101 may be referred to as a (remote and/or fixed) communication device. In some implementations, central communication device 101 may be configured to facilitate localized communications in a local communications network among a set of communication devices 104, such as, by way of non-limiting example, first communication device 104a, second communication device 104b, third communication device 104c, and/or other communication devices. In some implementations, individual antennas of central communication device 101 may be configured to operate in conjunction with individual transceivers that are included in central communication device 101 (not depicted). By virtue of having two separate antennas and two separate transceivers, communications by central communication device 101 may be improved (by way of non-limiting example, in terms of reliability, audio quality, and/or other quality factors) by providing different types of diversity. The different types of diversity may include one or more of antenna diversity, transceiver diversity, spatial diversity (e.g., if multiple antennas on central communication device 101 are disposed and/or positioned in different locations), frequency diversity, channel diversity, time diversity, and/or other types of diversity.

Communications between central communication device 101 and one or more communication devices 104 may be based on the exchange of packets of information that are formatted in one or more particular formats. As used herein, the direction from central communication device 101 to one or more communication devices 104 may be referred to as downlink and/or downstream. As used herein, the direction to central communication device 101 from one or more communication devices 104 may be referred to as uplink and/or upstream. Accordingly, information provided through uplink communication may be referred to as uplink information, information provided through downlink communication may be referred to as downlink information. In some implementations, packets may be formatted using a format based on the (IEEE) 802.11 family of standards. In some implementations, packets may have a proprietary format. In some implementations, downlink packets may be broadcast packets that are transmitted to multiple communication devices 104 at once. In some implementations, uplink packets may be device-specific packets that are transmitted by a particular communication device 104. Packetized communication may have overhead, e.g., due to the use of header information, which may reduce the efficiency of the communication. Broadcast packets may be more efficient than uplink packets, since information for multiple communication devices 104 may be transmitted at once, whereas uplink packets may only contain information from a single communication device 104.

Central communication device 101 may use different communication protocols, communication formats, and/or communication links to communicate with different ones (and/or different types) of communication devices 104 and/or other components of system 100. For example, central communication device 101 may use a primary (wireless)

communication link to communicate with first communication device 104a. In some implementations, central communication device 101 may use first antenna 101a (and a corresponding transceiver) to transmit and/or receive information over the primary communication link, using a first frequency range. In some implementations, central communication device 101 may use second antenna 101b (and a corresponding transceiver) to transmit and/or receive information over the primary communication link, using a second frequency range.

For example, central communication device 101 may use a secondary communication link to communicate with base station 103. In some implementations, communication via the secondary communication link may be based on the Ethernet family of standards. In some implementations, communication via the secondary communication link may be based on a proprietary format. In some implementations, communication over the secondary communication link may be point-to-point. In some implementations, communication over the secondary communication links may be supported in system 100 without the need or use of cellular networks or public networks.

For example, central communication device 101 may use a particular wireless communication link to communicate with one or more client communication devices 104, including but not limited to first communication device 104a, second communication device 104b, third communication device 104c, and/or other communication devices. In some implementations, communication (in particular registration and configuration) via this wireless communication link may include communication based on a short-range wireless communication protocol, contact-less information, and/or near-field communication (NFC). In some implementations, central communication device 101 may use a separate antenna (not depicted) to transmit and/or receive information over this particular communication link. In some implementations, communication over this particular communication link may be supported in system 100 without the need or use of cellular networks or public networks.

Information processing unit(s) 102 may be configured by machine-readable instructions 106. Machine-readable instructions 106 may include one or more instruction components. The instruction components may include computer program components. The instruction components may include one or more of packet generating component 108, packet transmission component 110, packet receiving component 112, channel mapping component 114, audio mixing component 126, and/or other instruction components. In some implementations, one or more of the instruction components may be part of other information processing units, including but not limited to information processing units 102a of base station 103.

Packet receiving component 112 may be configured to receive packets, including but not limited to broadcast packets, device-specific packets, and/or other packets. Receipt of packets may be scheduled, arranged, and/or otherwise timed in specific time periods. In some implementations, central communication device 101 may be configured to receive one or more device-specific packets. For example, packet receiving component 112 may receive multiple device-specific packets per time frame, such as a first, second, third, fourth, fifth, sixth, seventh, eighth, ninth, tenth, and/or other device-specific packets, e.g., from different communication devices 104.

For example, a first device-specific packet may be received by first central antenna 101a, e.g., during a first uplink time period that occurs within a first time frame. The first device-specific packet may be received from first end-user communication device 104a. The first device-specific packet may include packetized uplink information based on audio and/or video information captured by first end-user communication device 104a. The audio and/or video information captured by the first end-user communication device may be part of audio communication (through system 100) between different users. The first device-specific packet may be targeted to a given communication group, such as, e.g., a first communication group. In some implementations, the first device-specific packet may have a given destination, such as, e.g., the first communication group. By way of non-limiting example, individual communication groups may be associated with one or more voice communication channels selected from a set of broadcast communication channels. Individual ones of the one or more communication groups may be specific to one or more (types of) roles of people interacting within a group of people, such as a crew of employees in a quick-service restaurant. For example, in reference to FIG. 3A, audio information in a device-specific packet targeted to the first communication group may be included in the first, third, fourth, and sixth broadcast channels.

Packet receiving component 112 may be configured to receive a second device-specific packet, e.g., during a second uplink time period that occurs within the first time frame or within a second time frame. In some implementations, the second uplink time period may occur subsequent to the occurrence of the first uplink time period. The second device-specific packet may be received from second end-user communication device 104b. The second device-specific packet may include packetized uplink information based on audio and/or video information captured by second end-user communication device 104b. The audio and/or video information captured by second end-user communication device 104b may be part of audio communication (through system 100) between different users. The second device-specific packet may be targeted to a given communication group, such as, e.g., the second voice communication channel. In some implementations, the second device-specific packet may have a given destination, such as, e.g., the second communication group. For example, in reference to FIG. 3A, audio information in a device-specific packet targeted to the second communication group may be included in the second, third, fifth, and sixth broadcast channels.

Packet receiving component 112 may be configured to receive a third device-specific packet, e.g., during a third uplink time period that occurs within the first time frame, the second time frame, or within a third time frame. In some implementations, the third uplink time period may occur subsequent to the occurrence of the first and second uplink time periods. The third device-specific packet may be received from third end-user communication device 104c. The third device-specific packet may include packetized uplink information based on audio and/or video information captured by third end-user communication device 104c. The audio and/or video information captured by third end-user communication device 104c may be part of audio communication (through system 100) between different users. The third device-specific packet may be targeted to a given communication group, such as, e.g., the third communication group. In some implementations, the third device-specific packet may have a given destination, such as, e.g., the third communication group. For example, in reference to FIG. 3A, audio information in a device-specific packet targeted to the third communication group may be included in the fourth, fifth, sixth, and seventh broadcast channels. And so forth for additional device-specific packets.

Figure 4:
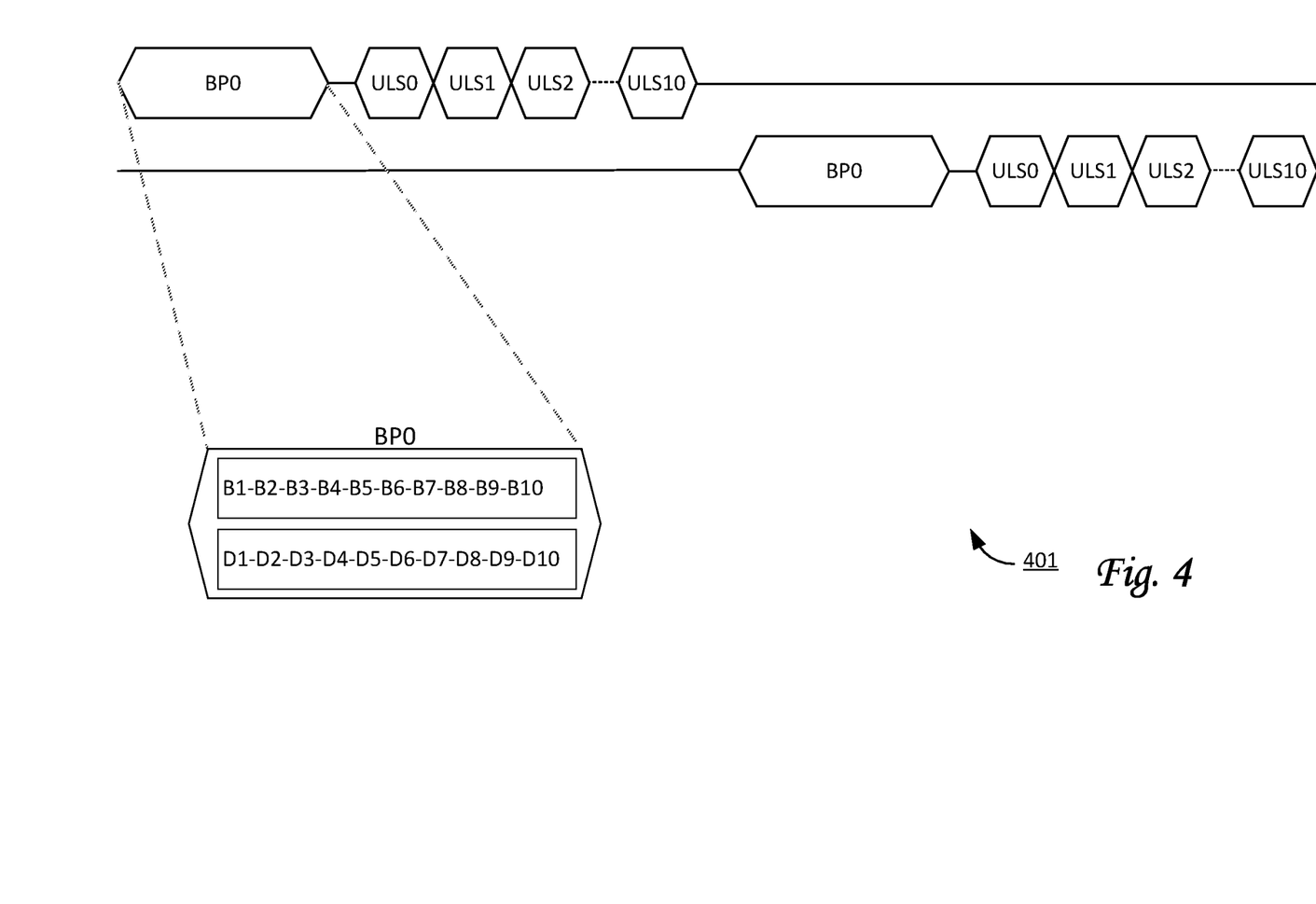
FIG. 4 illustrates an exemplary time frame as may be used by a system configured for managing voice communication channels used by a group of people, in accordance with one or more implementations.

By way of non-limiting example, FIG. 4 illustrates an exemplary time frame 401 having a top portion and a bottom portion (using different sections of the same frequency range), with the top portion showing a first, second, and third through tenth time period (for device-specific packets ULS0, ULS1, ULS2, and ULS10 in chronological order). The bottom section shows the same packets being transmitted at a later time.

Referring to FIG. 1, packet generating component 108 may be configured to generate packets, including but not limited to broadcast packets, downlink packets, device-specific packets, and/or other packets. In some implementations, downlink packets may include a first downlink packet, a second downlink packet, a third downlink packet, and/or other downlink packets. In some implementations, one or more broadcast and/or downlink packets may be generated by central communication device 101. In some implementations, one or more downlink packets may be generated by base station 103. Individual downlink packets may include packetized downlink information. By way of non-limiting example, (contents of) packetized downlink information may be based on audio and/or video information that was previously (e.g., in a previous time frame) included in one or more other packets, e.g., one or more device-specific packets and/or other uplink information. In some implementations, individual downlink packets may include packetized downlink information that is organized in a set of broadcast channels. In some implementations, individual downlink packets may have a target and/or destination indication that indicates a network destination in the local communications network for the included packetized downlink information. For example, the network destination may include and/or indicate one or more specific communication devices 104, one or more specific communication groups, and/or other destinations. The set of broadcast channels may include a first broadcast channel, a second broadcast channel, a third broadcast channel, and so forth. Individual broadcast channels may be used for previously received audio information that was targeted to one or more communication groups that are associated with one or more voice communication channels selected from a set of broadcast communication channels. For example, the first broadcast channel may be used for audio information targeted to the first communication group (in accordance with exemplary set of communication groups 301 of FIG. 3A, and the corresponding associations between individual voice communication channels and subsets of the set of communication groups). For example, the second broadcast channel may be used for audio information targeted to the second communication group (in accordance with exemplary set of communication groups 301 of FIG. 3A). For example, the third broadcast channel may be used for audio information targeted, at least, to one of the first and second communication groups (in accordance with exemplary set of communication groups 301 of FIG. 3A). For example, the fourth broadcast channel may be used for audio information targeted, at least, to one of the first and third communication groups (in accordance with exemplary set of communication groups 301 of FIG. 3A). For example, the fifth broadcast channel may be used for audio information targeted, at least, to one of the second and third communication groups (in accordance with exemplary set of communication groups 301 of FIG. 3A). For example, the sixth broadcast channel may be used for audio information targeted, at least, to one of the first through third communication groups (in accordance with exemplary set of communication groups 301 of FIG. 3A). For example, the seventh broadcast channel may be used for audio information targeted to the third communication group (in accordance with exemplary set of communication groups 301 of FIG. 3A). In some implementations, device-specific packets may be generated by individual communication devices 104.

By way of non-limiting example, FIG. 4 illustrates an exemplary time frame 401 having a top portion and a bottom portion (using different sections of the same frequency range), with the top portion showing a first downlink packet labeled "BP0", which includes the first through tenth broadcast channels. The indicated use of ten broadcast channels is exemplary and not intended to be limiting.

Referring to FIG. 1, in some implementations, packet generating component 108 may be configured to generate downlink packets that include packetized downlink information that is organized in a set of dedicated channels. In some implementations, individual dedicated channels may have a target and/or a destination that is a specific communication device 104, such that the audio information on an individual dedicated channel excludes audio information received from the specific communication device 104. As a result, the user of the specific communication device 104 will not receive an echo through the individual dedicated channel of their own audio. For example, a first dedicated channel may include the same audio information as the first broadcast channel, minus the audio information received from first communication device 104a (for example, if the audio information from first communication device 104a targeted the first communication group, the first dedicated channel would include the audio information targeted to the first communication group). For example, a second dedicated channel may include the same audio information as the second broadcast channel, minus the audio information received from second communication device 104b (for example, if the audio information from second communication device 104b targeted the second communication group, the second dedicated channel would include the audio information targeted to the second communication group). For example, a third dedicated channel may include the same audio information as the third broadcast channel, minus the audio information received from third communication device 104c (for example, if the audio information from third communication device 104c targeted the third communication group, the second dedicated channel would include the audio information targeted to the third communication group), and so forth.

By way of non-limiting example, FIG. 4 illustrates an exemplary time frame 401 having a top portion and a bottom portion (using different sections of the same frequency range), with the top portion showing a first downlink packet labeled "BP0", which includes the first through tenth dedicated channels, in addition to broadcast channels. The indicated use of ten dedicated channels is exemplary and not intended to be limiting. The bottom portion also shows downlink packet labeled "BP0", which may be transmitted at a different time.

Referring to FIG. 1, packet transmission component 110 may be configured to transmit packets, including but not limited to downlink packets, device-specific packets, and/or other packets. Transmission of packets may be scheduled, arranged, and/or otherwise timed in specific time periods. As used herein, time periods are periods of time, having a specified and/or limited duration. A set or sequence of time periods may be scheduled, arranged, and/or otherwise timed to occur in particular time frames. In some implementations, different periods in a set or sequence may not overlap. For example, the duration of individual time frames may be between 1 and 3 ms, between 4 and 6 ms, about 5 ms, between 5 and 10 ms, between 8 and 12 ms, about 10 ms, about 15 ms, between 10 and 20 ms, and/or another duration. In some implementations, individual time periods may include time slots.

In some implementations, downlink packets may be transmitted by central communication device 101. For example, a first downlink packet may be transmitted via first central antenna 101a (of the first central transceiver) of central communication device 101 to a set of end-user communication devices 104. For example, a second downlink packet may be transmitted via second central antenna 101b (of the second central transceiver) of central communication device 101 to the same set of end-user communication devices 104. In some implementations, the first and second downlink packets may be transmitted in different time periods during the same time frame. In some implementations, individual time frames may include two downlink packets. In some implementations, individual time frames may include more than two downlink packets. Transmission of the first downlink packet may use a first channel of a first frequency range. As used herein, channels are designated sub-ranges within a frequency range, commonly having equal bandwidths and/or equally-spaced-apart bandwidths. For example, transmission of the second downlink packet may use a second channel of the first frequency range (wherein the first channel is different from the second channel). For example, the frequency range may be 900 MHz, 1.9 GHz, 2.4 GHz, 5 GHz, and/or at least 5 GHz. In some implementations, individual channels of a particular frequency range may use a 5 MHz bandwidth per channel, 10 MHz, 20 MHz, 40 MHz, and/or use another bandwidth per channel. By way of non-limiting example, for the 5 GHz frequency range, so-called channel 32 may range from 5150 to 5170 MHz, channel 46 may range from 5210 to 5250 MHz, and so forth.

In some implementations, device-specific packets may be transmitted by individual communication devices 104. For example, a first device-specific packet may be transmitted via an antenna 105a (of a transceiver) of first end-user communication device 104a. For example, a second device-specific packet may be transmitted via an antenna 105b (of a different transceiver) of second end-user communication device 104b. For example, a third device-specific packet may be transmitted via antenna 105c (of yet a different transceiver) of third end-user communication device 104c. In some implementations, the first, second, and third device-specific packets may be transmitted in different time periods and/or during the same time frame. For example, transmission of the first device-specific packet may use the first channel of the first frequency range. For example, transmission of the second device-specific packet may use the first channel of the first frequency range. For example, transmission of the third device-specific packet may use the first channel of the first frequency range.

Channel mapping component 114 may be configured to determine mappings between individual communication groups (as targeted by device-specific packets) and individual broadcast channels. For example, the selection of individual broadcast channels may be in accordance with a particular selection from the set of communication groups. In some implementations, channel mapping component 114 may be configured to determine mappings between individual voice communication channels (as targeted by device-specific packets) and individual dedicated channels in downlink packets. In some implementations, determinations by channel mapping component 114 may be based on a particular set of communications groups, as for example depicted in FIGS. 3A-3B-3C-3D.

Figure 3C:
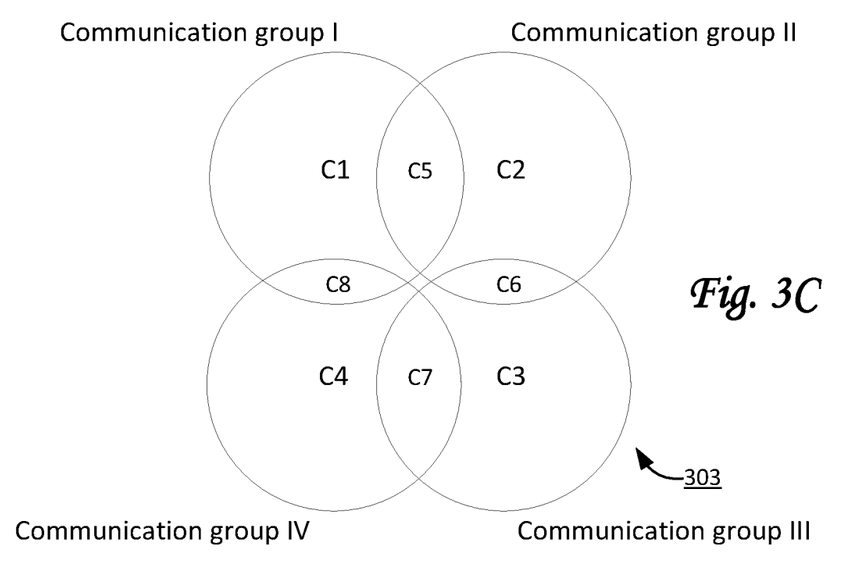

Audio mixing component 126 may be configured to mix audio information from different communication devices 104 (as received through device-specific packets) into individual broadcast channels, dedicated channel, and/or other channels. In some implementations, audio mixing component 126 may operate based on determinations made by channel mapping component 114. By way of non-limiting example, FIG. 3C illustrates an exemplary set 303 of four communication groups that are specific to different (types of) roles and/or locations in a work area, such as a quick-service restaurant. The first communication group is indicated by the circle with label "C1" in the center, the second communication group is indicated by the circle with label "C2" in the center, the third communication group is indicated by the circle with label "C3" in the center, and the fourth communication group is indicated by the circle with label "C4" in the center. Communication for different subsets of these four communication groups may use eight different voice communication channels as depicted. Communication to the first communication group may use a first, fifth, and eighth voice communication channel. Communication to the second communication group may use a second, fifth, and sixth voice communication channel. Communication to the third communication group may use a third, sixth, and seventh voice communication channel. Communication to the fourth communication group may use a fourth, seventh, and eighth voice communication channel. Users interested in communication to both the first and second communication groups may select the fifth voice communication channel "C5". Users interested in communication to both the second and third communication groups may select the sixth voice communication channel "C6". Users interested in communication to both the third and fourth communication groups may select the seventh voice communication channel "C7". Users interested in communication to both the fourth and first communication groups may select the eighth voice communication channel "C8".

Figure 3D:
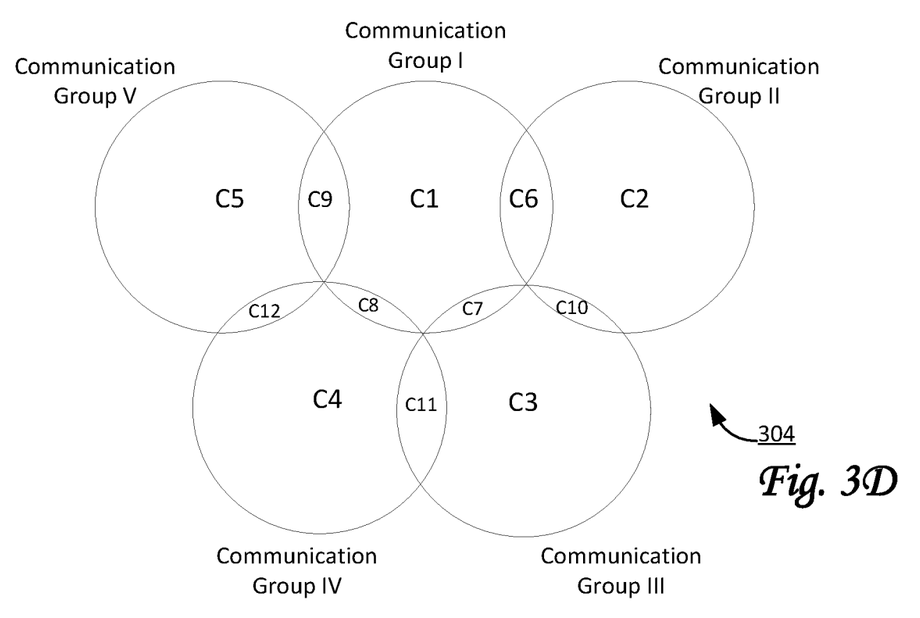

By way of non-limiting example, FIG. 3D illustrates an exemplary set 304 of five communication groups that are specific to different (types of) roles and/or locations in a work area, such as a quick-service restaurant. Communication for different subsets of these five communication groups may use twelve different voice communication channels as depicted.

Referring to FIG. 1, a given communication device 104 may include one or more processors configured to execute computer program components. The computer program components may be configured to enable an expert or user associated with the given communication device 104 to interface with system 100 and/or external resources 120, and/or provide other functionality attributed herein to communication device(s) 104. By way of non-limiting example, the given communication device 104 may include one or more of a desktop computer, a laptop computer, a handheld computer, a tablet computing platform, a NetBook, a Smartphone, a belt pack, a smart band, smart glasses, a headset, an earbud, a gaming console, and/or other computing platforms.

External resources 120 may include sources of information outside of system 100, external entities participating with system 100, and/or other resources. In some implementations, some or all of the functionality attributed herein to external resources 120 may be provided by resources included in system 100.

Information processing unit(s) 102 may include electronic storage 122, one or more processors 124, and/or other components. Information processing unit(s) 102 may include communication lines, or ports to enable the exchange of information with a network and/or other computing platforms. Illustration of information processing unit(s) 102 in FIG. 1 is not intended to be limiting. Information processing unit(s) 102 may include a plurality of hardware, software, and/or firmware components operating together to provide the functionality attributed herein to information processing unit(s) 102. For example, information processing unit(s) 102 may be implemented by a cloud of computing platforms operating together as information processing unit(s) 102. In some implementations, individual information processing units may be servers.

User interfaces 140 may be configured to facilitate interaction between users and system 100 and/or between users and communication devices 104. For example, user interfaces 140 may provide an interface through which users may provide information to and/or receive information from system 100. In some implementations, user interface 140 may include one or more of a display screen, touchscreen, monitor, a smart band, a keyboard, buttons, switches, knobs, levers, mouse, speakers, headphones, microphones, sensors to capture voice commands, sensors to capture eye movement and/or body movement, sensors to capture hand and/or finger gestures, and/or other user interface devices configured to receive and/or convey user input. In some implementations, one or more user interfaces 140 may be included in one or more communication devices 104. In some implementations, one or more user interfaces 140 may be included in system 100.

Electronic storage 122 may comprise non-transitory storage media that electronically stores information. The electronic storage media of electronic storage 122 may include one or both of system storage that is provided integrally (i.e., substantially non-removable) with information processing unit(s) 102 and/or removable storage that is removably connectable to information processing unit(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from information processing unit(s) 102, information received from communication device(s) 104, and/or other information that enables information processing unit(s) 102 to function as described herein.

In some implementations, information stored in electronic storage 122 may include information that represents associations of individual voice communication channels with one or more communication groups. The individual ones of the one or more communication groups may be specific to one or more roles of people and/or employees, e.g. employees in a quick-service restaurant. The individual ones of the one or more communication groups may be specific to one or more types of roles of interacting people and/or employees, e.g. employees in a quick-service restaurant. In some implementations, the associations may include a first association between a first voice communication channel and a first communication group. The first communication group may be specific to (a first type of) roles in the quick-service restaurant that are related to a first drive-through lane. In some implementations, the associations may include a second association between a second voice communication channel and a second communication group. The second communication group may be specific to (a second type of) roles in the quick-service restaurant that are related to a second drive-through lane. In some implementations, the associations may include a third association between a third voice communication channel and the first and second communication groups. In some implementations, the associations may include a fourth association between a fourth voice communication channel and the first communication group and a third communication group. The third communication group may be specific to (a third type of) roles in the quick-service restaurant that are related to food production. In some implementations, the associations may include a fifth association between a fifth voice communication channel and the second and third communication groups. In some implementations, the associations may include a sixth association between a sixth voice communication channel and the first, second, and third communication groups. In some implementations, the associations may include a seventh association between a seventh voice communication channel and the third communication group. In some implementations, the associations may include an eighth association between an eighth voice communication channel and the first communication group and a fourth communication group. The fourth communication group may be specific to (a fourth type of) roles in the quick-service restaurant that are related to the front counter. In some implementations, the associations may include a ninth association between a ninth voice communication channel and the fourth communication group. For example, these nine voice communication channels may correspond to exemplary set of communication groups 302 of FIG. 3B. Different sets of communication groups (overlapping in different ways) may use voice communication channels differently as needed, using a different set of associations.

Referring to FIG. 1, processor(s) 124 may be configured to provide information processing capabilities in information processing unit(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, 114, and/or 126, and/or other components. Processor(s) 124 may be configured to execute components 108, 110, 112, 114, and/or 126, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 126 are illustrated in FIG. 1 as being implemented within a single processing unit, in implementations in which processor(s) 124 includes multiple processing units, one or more of components 108, 110, 112, 114, and/or 126 may be implemented remotely from the other components. The description of the functionality provided by the different components 108, 110, 112, 114, and/or 126 described below is for illustrative purposes, and is not intended to be limiting, as any of components 108, 110, 112, 114, and/or 126 may provide more or less functionality than is described. For example, one or more of components 108, 110, 112, 114, and/or 126 may be eliminated, and some or all of its functionality may be provided by other ones of components 108, 110, 112, 114, and/or 126. As another example, processor(s) 124 may be configured to execute one or more additional components that may perform some or all of the functionality attributed below to one of components 108, 110, 112, 114, and/or 126.

In some implementations, central communication device(s) 101, information processing unit(s) 102, communication device(s) 104, and/or external resources 120 may be operatively linked via one or more electronic communication links. For example, such electronic communication links may be established, at least in part, via one or more networks 13 and/or other networks. It will be appreciated that this is not intended to be limiting, and that the scope of this disclosure includes implementations in which central communication device(s) 101, information processing unit(s) 102, communication device(s) 104, and/or external resources 120 may be operatively linked via some other communication media.

As depicted in FIG. 1, base station 103 may include one or more information processing units 102a, electronic storage 122a, one or more processors 124a, machine-readable code instructions 106a, and/or other components. Information processing units 102a may be the same as or similar to information processing units 102, though embedded and/or integrated within base station 103. In other words, information processing units 102a may perform similar features as information processing units 102. Electronic storage 122a may be the same as or similar to electronic storage 122, though embedded and/or integrated within base station 103. In other words, electronic storage 122a may perform similar features as electronic storage 122. Processors 124a may be the same as or similar to processors 124, though embedded and/or integrated within base station 103. In other words, processors 124a may perform similar features as processors 124. Machine-readable code instructions 106a may be the same as or similar to machine-readable code instructions 106, though embedded and/or integrated within base station 103. In other words, machine-readable code instructions 106a may perform similar features as machine-readable code instructions 106.

Figure 2:
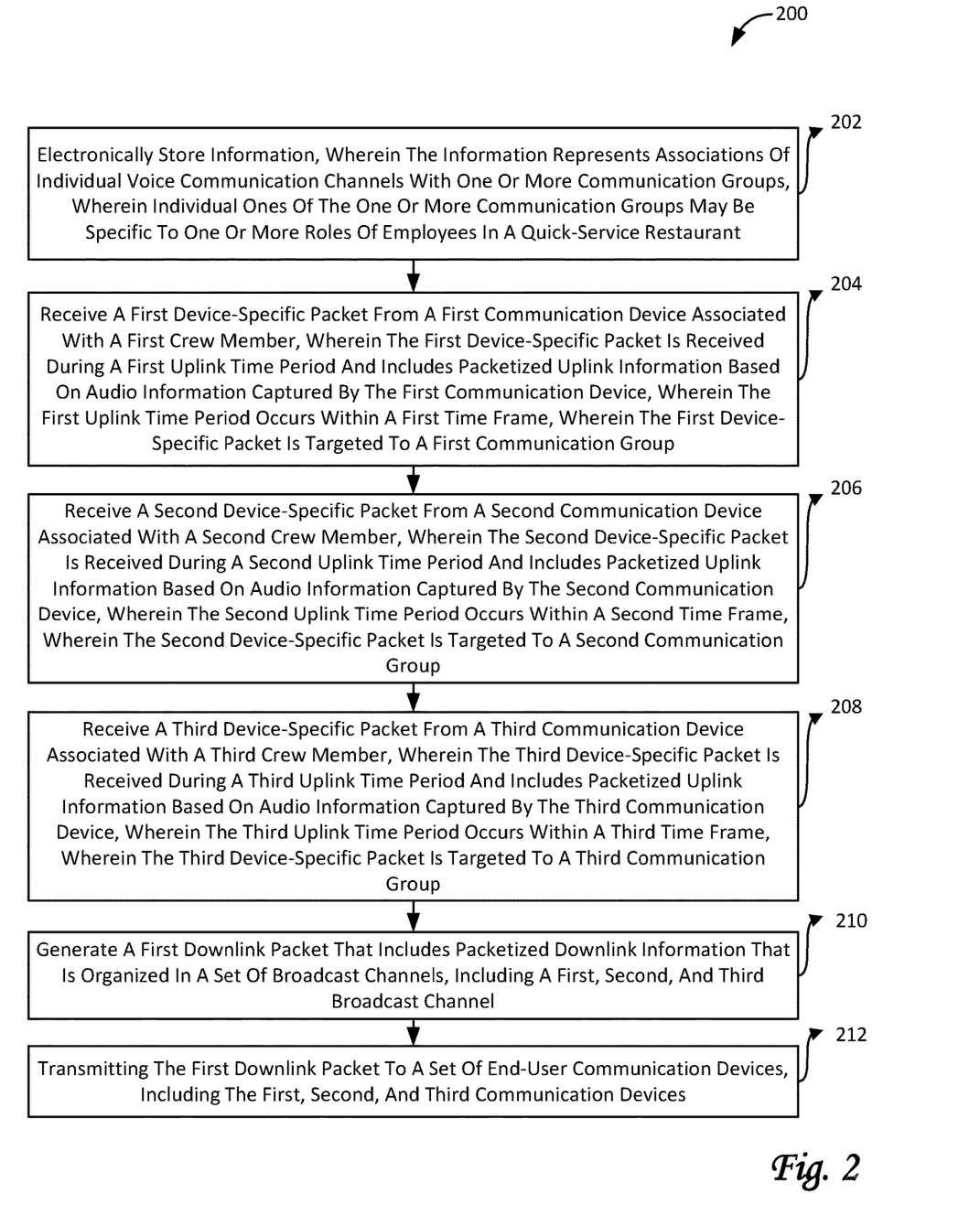
FIG. 2 illustrates a method for managing voice communication channels used by a crew of employees in a quick-service restaurant having one of more drive-through lanes, in accordance with one or more implementations.

FIG. 2 illustrates a method 200 for managing voice communication channels used by a group of people, e.g., by crew of employees in a quick-service restaurant having a first drive-through lane and, in some cases, a second drive-through lane, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202, information is electronically stored. The information represents associations of individual voice communication channels with one or more communication groups. Individual ones of the one or more communication groups may be specific to one or more roles or types of roles of people interacting, such as employees in a quick-service restaurant. Individual ones of the one or more communication groups may be specific to one or more types of roles of employees in the quick-service restaurant. In some embodiments, operation 202 is performed by electronic storage the same as or similar to electronic storage 122 (shown in FIG. 1 and described herein).

At an operation 204, a first device-specific packet is received from a first communication device associated with, e.g., a first crew member. The first device-specific packet is received during a first uplink time period and includes packetized uplink information based on audio information captured by the first communication device. The first uplink time period occurs within a first time frame. The first device-specific packet is targeted to the first communication group. In some embodiments, operation 204 is performed by a packet receiving component the same as or similar to packet receiving component 112 (shown in FIG. 1 and described herein).

At an operation 206, a second device-specific packet is received from a second communication device associated with, e.g., a second crew member. The second device-specific packet is received during a second uplink time period and includes packetized uplink information based on audio information captured by the second communication device. The second uplink time period occurs within a second time frame. The second device-specific packet is targeted to the second communication group. In some embodiments, operation 206 is performed by a packet receiving component the same as or similar to packet receiving component 112 (shown in FIG. 1 and described herein).

At an operation 208, a third device-specific packet is received from a third communication device associated with, e.g., a third crew member. The third device-specific packet is received during a third uplink time period and includes packetized uplink information based on audio information captured by the third communication device. The third uplink time period occurs within a third time frame. The third device-specific packet is targeted to the third communication group. In some embodiments, operation 208 is performed by a packet receiving component the same as or similar to packet receiving component 112 (shown in FIG. 1 and described herein).

At an operation 210, a first downlink packet is generated that includes packetized downlink information that is organized in a set of broadcast channels. The set of broadcast channels includes a first broadcast channel that is used for audio information received in device-specific packets that were targeted to the first communication group (in accordance with a specific selected subset of communication groups that are associated with a selected voice communication channel). A second broadcast channel is used for audio information received in device-specific packets that were targeted to the second communication group (in accordance with a specific selected subset of communication groups that are associated with a selected voice communication channel). A third broadcast channel is used for audio information received in device-specific packets that were targeted to one of the first or second communication groups (in accordance with a specific selected subset of communication groups that are associated with a selected voice communication channel). In some embodiments, operation 210 is performed by a packet generating component 108 the same as or similar to packet generating component 108 (shown in FIG. 1 and described herein).

At an operation 212, the first downlink packet is transmitted to a set of end-user communication devices, including the first, second, and third communication devices. In some embodiments, operation 212 is performed by a packet transmission component the same as or similar to packet transmission component 110 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A communication system configured for managing voice communication channels used by a group of people interacting with each other, wherein individual voice communication channels are associated with one or more communication groups selected from a set of communication groups, wherein the set of communication groups includes four or more communication groups including a first communication group, a second communication group, a third communication group, and a fourth communication group, and wherein individual associations are between the individual voice communication channels and individual subsets of the set of communication groups, the system comprising:
one or more hardware processors configured by machine-readable instructions to:
receive a first device-specific packet from a first communication device, wherein the first device-specific packet is received during a first uplink time period and includes packetized uplink information based on audio information captured by the first communication device, wherein the first device-specific packet is targeted to the first communication group;
receive a second device-specific packet from a second communication device, wherein the second device-specific packet is received during a second uplink time period and includes packetized uplink information based on audio information captured by the second communication device, wherein the second device-specific packet is targeted to the second communication group;
receive a third device-specific packet from a third communication device, wherein the third device-specific packet is received during a third uplink time period and includes packetized uplink information based on audio information captured by the third communication device, wherein the third device-specific packet is targeted to the third communication group;
receive a fourth device-specific packet from a fourth communication device, wherein the fourth device-specific packet is received during a fourth uplink time period and includes packetized uplink information based on audio information captured by the fourth communication device, wherein the fourth device-specific packet is targeted to the fourth communication group;
generate a first downlink packet including packetized downlink information organized in a set of broadcast channels, wherein individual ones of the set of broadcast channels are used for audio information received in device-specific packets targeted to the individual voice communication channels, in accordance with the individual associations pertaining to the individual voice communication channels; and
transmit the first downlink packet to a set of end-user communication devices, including the first, second, third, and fourth communication devices.

2. The communication system of claim 1, wherein the first downlink packet includes the audio information captured by the first communication device and the audio information captured by the second communication device, wherein the first communication device is associated with a speaker post in a first drive-through lane, and wherein the second communication device is associated with a second speaker post in a second drive-through lane.

3. The communication system of claim 1, wherein the first downlink packet further includes the audio information captured by the third communication device.

4. The communication system of claim 1, wherein the first downlink packet further includes the audio information captured by the fourth communication device.

5. The communication system of claim 1, wherein the first device-specific packet is received wirelessly.

6. The communication system of claim 1, wherein the third communication device is part of the third communication group, and wherein the fourth communication device is part of the fourth communication group.

7. The communication system of claim 1, wherein the first downlink packet is transmitted at least twice in the same time frame.

8. The communication system of claim 7, wherein two transmissions of the first downlink packet within the same time frame occur on different channels of a particular frequency range.

9. The communication system of claim 1, wherein the first, second, and third uplink time periods do not overlap in time.

10. The communication system of claim 1, wherein the first downlink packet is transmitted within a given time frame, and wherein the given timeframe has a duration between 5 and 15 ms.

11. A method for managing voice communication channels used by a group of people interacting with each other, wherein individual voice communication channels are associated with one or more communication groups selected from a set of communication groups, wherein the set of communication groups includes four or more communication groups including a first communication group, a second communication group, a third communication group, and a fourth communication group, wherein individual associations are between the individual voice communication channels and individual subsets of the set of communication groups, the method comprising:

receiving a first device-specific packet from a first communication device, wherein the first device-specific packet is received during a first uplink time period and includes packetized uplink information based on audio information captured by the first communication device, wherein the first device-specific packet is targeted to the first communication group;

receiving a second device-specific packet from a second communication device, wherein the second device-specific packet is received during a second uplink time period and includes packetized uplink information based on audio information captured by the second communication device, wherein the second device-specific packet is targeted to the second communication group;

receiving a third device-specific packet from a third communication device, wherein the third device-specific packet is received during a third uplink time period and includes packetized uplink information based on audio information captured by the third communication device, wherein the third device-specific packet is targeted to the third communication group;

receiving a fourth device-specific packet from a fourth communication device, wherein the fourth device-specific packet is received during a fourth uplink time period and includes packetized uplink information based on audio information captured by the fourth communication device, wherein the fourth device-specific packet is targeted to the fourth communication group;

generating a first downlink packet including packetized downlink information that is organized in a set of broadcast channels, wherein individual ones of the set of broadcast channels are used for audio information received in device-specific packets targeted to the individual voice communication channels, in accordance with the individual associations pertaining to the individual voice communication channels; and transmitting the first downlink packet to a set of end-user communication devices, including the first, second, third, and fourth communication devices.

12. The method of claim 11, wherein the first downlink packet includes the audio information captured by the first communication device and the audio information captured by the second communication device, wherein the first communication device is associated with a speaker post in a first drive-through lane, and wherein the second communication device is associated with a second speaker post in a second drive-through lane.

13. The method of claim 11, wherein the first downlink packet further includes the audio information captured by the third communication device.

14. The method of claim 11, wherein the first downlink packet further includes the audio information captured by the fourth communication device.

15. The method of claim 11, wherein the first device-specific packet is received wirelessly.

16. The method of claim 11, wherein the third communication device is part of the third communication group, and wherein the fourth communication device is part of the fourth communication group.

17. The method of claim 11, wherein the first downlink packet is transmitted at least twice in the same time frame.

18. The method of claim 17, wherein two transmissions of the first downlink packet within the same time frame occur on different channels of a particular frequency range.

19. The method of claim 11, wherein the first, second, and third uplink time periods do not overlap in time.

20. The method of claim 11, wherein the first downlink packet is transmitted within a given time frame, and wherein the given timeframe has a duration between 5 and 15 ms.

* * * * *